United States Patent
Leong et al.

(10) Patent No.: US 8,634,414 B2
(45) Date of Patent: Jan. 21, 2014

(54) MODULAR DIGITAL PROCESSING SYSTEM FOR TELECOMMUNICATIONS SATELLITE PAYLOADS

(75) Inventors: Chiok Keng Leong, Stevenage (GB); Paul Simon Cornfield, Stevenage (GB); Anthony Duncan Craig, Stevenage (GB)

(73) Assignee: Astrium Limited, Hertfordshire (GB)

( * ) Notice: Subject to any disclaimer, the term of this patent is extended or adjusted under 35 U.S.C. 154(b) by 312 days.

(21) Appl. No.: 12/988,481

(22) PCT Filed: Apr. 17, 2009

(86) PCT No.: PCT/EP2009/054626
§ 371 (c)(1),
(2), (4) Date: Dec. 17, 2010

(87) PCT Pub. No.: WO2009/144096
PCT Pub. Date: Dec. 3, 2009

(65) Prior Publication Data
US 2011/0110401 A1    May 12, 2011

(30) Foreign Application Priority Data
Apr. 18, 2008  (EP) ..................................... 08275007
Apr. 18, 2008  (GB) ..................................... 0807052.6

(51) Int. Cl.
  *H04L 12/28*   (2006.01)
  *H04L 12/56*   (2011.01)
(52) U.S. Cl.
  USPC ........................................................ 370/389
(58) Field of Classification Search
  None
  See application file for complete search history.

(56) References Cited

U.S. PATENT DOCUMENTS

| | | |
|---|---|---|
| 5,623,269 A | 4/1997 | Hirshfield et al. |
| 5,956,620 A | 9/1999 | Lazaris-Brunner et al. |
| 6,175,719 B1 | 1/2001 | Sarraf et al. |
| 6,408,164 B1 | 6/2002 | Lazaris-Brunner et al. |
| 6,704,544 B1 | 3/2004 | Sarraf et al. |
| 7,024,158 B2 | 4/2006 | Wiswell |
| 7,031,272 B2 | 4/2006 | Campanella |
| 7,327,698 B1 | 2/2008 | Anselmo |
| 7,542,716 B2* | 6/2009 | Bell et al. ............... 455/3.02 |
| 2001/0034206 A1 | 10/2001 | Thompson et al. |
| 2004/0092227 A1 | 5/2004 | Sarraf et al. |

(Continued)

FOREIGN PATENT DOCUMENTS

| | | |
|---|---|---|
| EP | 0 854 590 A | 7/1998 |
| EP | 0 889 605 A2 | 1/1999 |

(Continued)

OTHER PUBLICATIONS

International Search Report (PCT/ISA/210) for PCT/EP2009/054626 dated Sep. 22, 2009.

(Continued)

*Primary Examiner* — Ayaz Sheikh
*Assistant Examiner* — Blanche Wong
(74) *Attorney, Agent, or Firm* — Buchanan Ingersoll & Rooney PC (57) ABSTRACT

A telecommunications satellite payload processing system having one or more identical generic integrated processor modules is provided. The number of integrated processor modules can be selected in accordance with the antenna and bandwidth characteristics of a specified mission uplink and downlink in relation to the characteristics of the integrated processor module.

32 Claims, 5 Drawing Sheets

(56) References Cited

U.S. PATENT DOCUMENTS

| | | |
|---|---|---|
| 2004/0185775 A1 | 9/2004 | Bell et al. |
| 2008/0045146 A1 | 2/2008 | Wahlberg et al. |
| 2008/0055151 A1 | 3/2008 | Hudson et al. |
| 2008/0055152 A1 | 3/2008 | Hudson et al. |
| 2008/0055153 A1 | 3/2008 | Hudson et al. |
| 2008/0056176 A1 | 3/2008 | Hudson et al. |
| 2008/0056189 A1 | 3/2008 | Hudson et al. |
| 2010/0255776 A1 | 10/2010 | Hudson et al. |

FOREIGN PATENT DOCUMENTS

| | | |
|---|---|---|
| EP | 1 014 598 A | 6/2000 |
| EP | 1 058 410 A | 12/2000 |
| GB | 2 430 311 A | 3/2007 |
| GB | 0708940.2 | 6/2007 |
| JP | 2003-332965 A | 11/2003 |
| RU | 2317641 C2 | 2/2008 |
| WO | 2008/027974 A2 | 3/2008 |
| WO | 2008/139219 A2 | 11/2008 |

OTHER PUBLICATIONS

Written Opinion (PCT/ISA/237) for PCT/EP2009/054626 dated Sep. 22, 2009.
European Search Report for EP 08275007 dated Sep. 26, 2008.
United Kingdom Search Report for GB 0807052.6 dated Aug. 11, 2008.
Office Action (Notice of Reasons for Rejection) dated Jul. 10, 2012, issued in corresponding Japanese Patent Application No. 2011-504481, and an English Translation thereof. (6 pages).
Decision on Grant dated Apr. 9, 2013 issued in corresponding Russian Application No. 2010146937/07(067797), 8 pps.

\* cited by examiner

MODULAR DIGITAL PROCESSING SYSTEM FOR TELECOMMUNICATIONS SATELLITE PAYLOADS

1. INTRODUCTION

In satellite communications, multiple spot beam systems are becoming increasingly common providing advantages in terms of antenna gain, which reduces power consumption and facilitates operation with small ground terminals, and in their capability to support spatial frequency reuse and hence, a higher throughput within a bandwidth limited system. Associated with multiple spot beam systems, is a need to provide flexibility in channel to beam routing in order to meet changes in traffic distribution between beams and to provide flexibility in frequency mapping between uplink and downlink in order to meet frequency planning constraints. With many systems now comprising more than one hundred beams, complex digital processing techniques within the main data-path of the payload are necessary in order to provide the required flexibility. The digital processors used within such multiple spot beam satellite systems are termed "transparent", in that the communications data-path signals are digitally sampled and processed but are not demodulated within the payload.

Systems currently using transparent digital processing are typically relevant to forward link, return link or mesh link system architecture categories. In forward link architectures, traffic is carried in the form of uplink, from a single or small number of gateways within a single or small number of beams, to downlink to a large number of user terminals within the multiple spot beam coverage. With such systems, there is a requirement to provide flexibility in routing a given gateway uplink channel to any of the downlink beams and flexibility in mapping a given uplink channel to any of the available frequency slots within the downlink beams.

In return link architectures, traffic is carried in uplink from a large number of user terminals within the multiple spot beam coverage to downlink to a single or small number of gateway terminals located within a single or small number of beams. Here, there is a requirement to provide flexibility in routing channels in any frequency slot in any of the user uplink beams into any available slot within the gateway downlink beam or beams. A mesh architecture is characterised by a large number of spot beams on both uplink and downlink and there is a requirement to provide flexibility in beam to beam routing and frequency mapping between uplink and downlink for any uplink channel.

The digital processor architectures currently used within multiple spot beam systems fall between either spatial switch or digital beam-forming architectures. In a spatial switch architecture, uplink signals, from a single or multiple beams, are digitally sampled by A/D converters and are digitally frequency demultiplexed to isolate individual channels. A switch system, operating on the individual channels, provides flexible routing of each uplink channel to the required frequency slot within the required downlink beam. Channels routed to a given downlink beam are frequency multiplexed and D/A converted to form the required analogue beam signal. Such an approach may be applied to forward, return or mesh architectures where the interfaces to the antenna system takes the form of beam ports, for example using a Single Feed Per Beam (SFPB) antenna.

In digital beam-forming architectures, processing may be used within payload architectures which utilise multiple feeds or elements within the antenna in order to synthesise a given spot beam and is particularly suited to phased array and array fed reflector (AFR) type antenna systems. Complex weighting functions within the beam-forming network for each channel are used to control beam properties for that channel. For example, channel weights may be chosen to define the direction of a given spot beam in accordance with ground terminal traffic distribution or control of the beam size and shape may be used to provide further flexibility. Digital beam-forming may be applied to the multiple spot beam links on any of forward, return or mesh system architectures.

Associated with the central digital processor, as bounded by the A/D and D/A converters, are analogue pre-processing and post-processing functions which condition the signals as input to the A/D converters and as output from the D/A converters. The combination of the central digital processing function and the analogue pre-processing and post-processing functions constitute an overall integrated processor.

Currently, the processing systems used within satellite systems are custom implemented according to the requirements of a specific mission. This typically involves a highly complex implementation in the form of a single unit sized according to mission requirements and requiring multiple lower level module designs, large numbers of high-density connectors and complex backplanes. The design and test times associated with these systems are lengthy, leading to high overall schedule and cost. High localised mass and power consumption requirements can make payload accommodation difficult, often requiring sophisticated thermal management. Such a single unit approach has limited utility for other missions that differ in size or scale.

It is an object of the present invention to provide a modular approach to integrated processor design and implementation for multiple spot beam type satellite communications systems whereby the overall integrated processor comprises a number of identical integrated processor modules. An integrated processor module may comprise a number of physically integrated components or a number of discrete components.

It is a further object of the present invention to provide a generic digital processor module which may be used to support system and traffic requirements of a broad range of missions differing in type and scale. The generic digital module provides either spatial switch or digital beam-forming functionality as options within the common module design. Whilst the central digital processing concept is generic it is expected that the detailed parameters of the pre-processing and post-processing functions will be mission specific, for example in accordance with link frequencies and bandwidths.

2. SUMMARY OF THE INVENTION

From a first aspect, the present invention resides in a telecommunications satellite payload processing system comprising one or more identical generic integrated processor modules, wherein the number of modules is selected in accordance with the antenna and bandwidth characteristics of a specified mission uplink and downlink, in relation to the characteristics of the integrated processor module.

In the preferred embodiment, each integrated processor module comprises a pre-processing stage a digital processor stage comprising: a plurality of input ports adapted to receive signals corresponding to an uplink, each input port having a predetermined bandwidth; and a plurality of output ports adapted to output signals corresponding to a downlink, each output port having a predetermined bandwidth; and a post-processing stage; and wherein the number of individual integrated processor modules in the telecommunications satellite payload processing system is a function of the uplink and downlink antenna ports and the respective uplink and downlink bandwidth relative to the number of input (N) and output (M) ports and the respective input and output port bandwidth of the digital processor stage. One or more of the input ports and/or output ports may provide redundancy.

Hence, the scale of the overall processor is determined by the use of multiple identical integrated processor modules according to higher level system requirements and parameters, in particular system bandwidth, the number of beam ports in a spatial switch architecture or the number of feeds/element ports within a digital beam-forming architecture. In an extreme instance, a single integrated processor module may be used on a small or piggy-back mission, whilst a relatively large number of modules (e.g. 6 or more) may be used to support a large scale mission (e.g., where the full communications capacity is processed). This modular approach may be used with either spatial switch or digital beam-forming processor architectures and implemented within a forward, return or mesh architecture. Large scale digital beam-forming architectures may require additional analogue hardware to link multiple processor modules.

The modular approach provides a low risk solution in that once an integrated processor module has been developed and tested, multiple copies of the proven module may be used to build the overall integrated processor for a specific mission. Furthermore the central processor module may be used as a generic processor building block across a range of mission types, characterised by either spatial switch or digital beam-forming requirements, thereby further reducing risk and non-recurring costs.

In a preferred embodiment, each digital processor stage further comprises an A/D converter associated with each input port and arranged to convert the uplink signal of a predetermined bandwidth to digital sample form; a D/A converter associated with each of the output ports and arranged to convert a processed digital signal of a predetermined bandwidth to an analogue downlink signal; digital processing means comprising a plurality of frequency demultiplexers, each connected to one or more of the plurality of A/D converters and arranged to separate the sampled bandwidth of one or more of the sampled uplink signals into a plurality of channels; channel level processing means associated with each of the channels and arranged to route processed channels to any of the plurality of output ports; a plurality of a frequency multiplexers, each connected to the channel level processing means and to one or more of the plurality of D/A converters and arranged to combine a plurality of routed channels.

In one embodiment, the channel level processing stage comprises a spatial switch system capable of flexibly routing a given input channel to one or more of the frequency multiplexers associated with the output ports. In an alternative embodiment, the channel level processing stage comprises a beam-forming network system. The channel level processing stage preferably also comprises a memory switch arranged to provide flexible routing between uplink and downlink frequency slots.

The pre-processing stage of each integrated processor module is associated with the plurality of input ports of the digital processor stage and is arranged to isolate a predetermined frequency band from the uplink, to down-convert the isolated band to an intermediate frequency and to apply the down-converted signal to one or more of the plurality of input ports. The pre-processing stage may comprise a pre-processing chain associated with each of the input ports, or multiple pre-processor chains, the outputs of which may be frequency multiplexed to provide predetermined input signals to one or more of the input ports.

In addition, the post-processing stage of each integrated processor module is associated with the plurality of output ports of the digital processor stage and is arranged to filter and up-convert the downlink signals to appropriate frequencies. The post-processing stage may comprise a post-processing chain associated with each of the output ports or multiple post-processing chains characterised by different up-conversions and filtering.

Advantageously, the integrated processor module may be implemented in one of: a mesh link, a forward link or a return link system architecture or a combination of these architectures.

In one embodiment comprising a spatial switch system, the integrated processor module is arranged to operate with single feed per beam antennas on both uplink and downlink. In this instance, the module interfaces to the antennas take the form of beam ports. In further embodiments comprising a beam-forming system, the user link antenna is a phased array comprising a plurality of antenna elements or an array fed reflector (AFR) comprising a plurality of feeds offset from the focal plane of a reflector.

In yet another embodiment comprising a beam-forming network system, where the integrated processor module is implemented in a forward link system architecture, a given input channel is preferably split to provide signals to multiple output ports of the digital processor stage, with channel samples being multiplied by complex coefficients in order to control downlink beam properties for that channel. Similarly, where the integrated processor module is implemented in a return link system architecture, a given input channel is formed from the summation of signals from multiple input ports of the digital processor stage with channel samples being multiplied by complex coefficients in order to control uplink beam properties for that channel.

The uplink or downlink preferably relate to ground terminals supporting a frequency multiplex of a plurality of channels. In a module comprising a beam-forming network system, each uplink or downlink channel may be associated with a separate digital beam-forming network, with a sampled channel being split according to the number of elements/feeds on the respective downlink or uplink antenna. In another embodiment, the bandwidth of the uplink or downlink is partitioned into a number of bandwidth segments, each segment being applied to or output from a single input or output port of the digital processor stage.

In one embodiment, a signal corresponding to each uplink beam or antenna element/feed is applied to a single input port of the digital processor stage and/or a signal corresponding to each downlink beam or antenna element/feed is output from a single output port of the digital processor stage. Alternatively, a signal corresponding to a plurality of uplink beams or antenna elements/feeds is applied to a single input port and/or a signal corresponding to a plurality of downlink beams or antenna elements/feeds is output from a single output port. In this instance, the pre-processing stage may be arranged to selectively down-convert the signals from the plurality of uplink beams or antenna elements/feeds to different centre frequencies and to sum the down-converted beams or element/feed signals prior to applying to the signal to an input port of the digital processor stage. In either of these embodiments, the post-processing stage may be arranged to selectively up-convert the signal from an output port of the digital processor stage to a plurality of downlink beams or antenna element/feeds.

In other embodiments, a plurality of integrated processor modules may be used. Signals corresponding to a subset of the plurality of uplink beams or antenna elements or feeds may be applied to the input ports of the digital processor stage of each module and/or signals corresponding to a subset of the plurality of downlink beams or antenna elements or feeds may be output from the output ports of the digital processor stage of each module. Alternatively, signals corresponding to the entire plurality of uplink beams or antenna elements or feeds are applied to the input ports of the digital processor stage of each module and/or signals corresponding to the entire plurality of downlink beams or antenna elements or feeds are output from the output ports of the digital processor stage of each module, and wherein each module is arranged to process a different segment of the overall beam or antenna element or feed bandwidth.

3. DESCRIPTION OF THE DRAWINGS

Embodiments of the invention will now be described by way of example only, with reference to the accompanying drawings in which.

4. DETAILED DESCRIPTION OF EMBODIMENTS OF INVENTION

Before describing various embodiments of the present invention, as implemented within various system architectures incorporating either a spatial/memory switch or digital beam-forming processor function, the basic structure of a generic processor module will initially be described.

Figure 1:
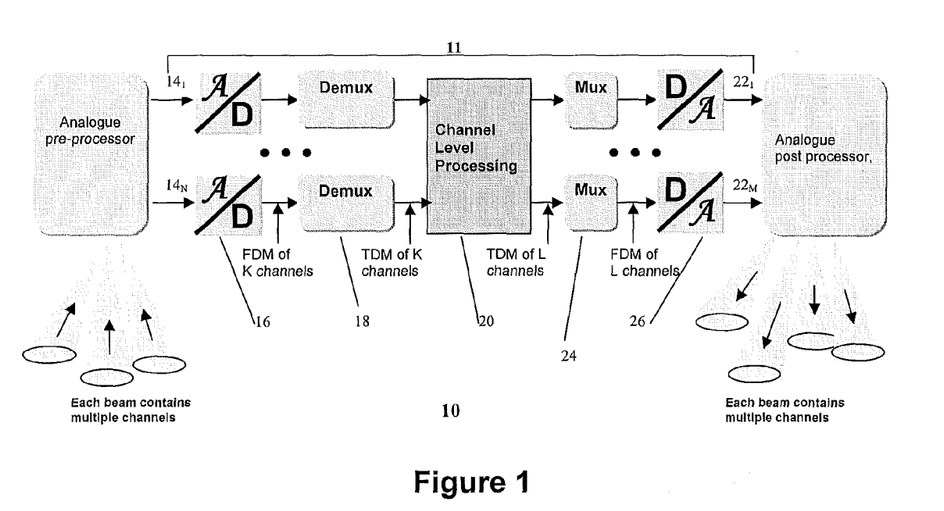
FIG. 1 is a simplified schematic representation of a generic integrated processor module according to the present invention.

Referring to FIG. 1, a generic integrated processor module 10 comprises an analogue pre-processing stage 12 for conditioning input signals before A/D conversion, a digital processor stage 11 comprising a plurality of input ports $14_{1-N}$, each input port having an A/D converter 16 that converts an input band of interest into digital sample form, and a digital demultiplexer 18 that separates the overall input band into a number of channels. The digital processor stage 11 has a plurality of output ports $22_{1-M}$, each comprising a digital multiplexer 24 that combines the narrowband channels and a D/A converter 26 to convert the combined signal so as provide the analogue port output signal. An analogue post-processing stage 28 is associated with the output ports of the digital processor stage 11 for up-converting the output signal to the desired frequency and filtering unwanted images. Although FIG. 1 shows only a single integrated processor module, it should be understood that a telecommunications satellite payload processing system may comprise one or more identical such modules depending on the antenna and bandwidth characteristics of a specified mission uplink and downlink.

Referring to FIG. 1, between the input demultiplexers 18 and the output multiplexers 24 of the digital processor stage 11, a central channel level processing stage 20 (typically a spatial/memory switch or digital beam-forming system) provides the mechanism to flexibly route channels between input and output ports, to flexibly map channels between input and output port frequencies and, in the case of digital-beam-forming, to provide flexible complex weighting of channel signals in order to control beam properties. It should be understood that the term integrated processor module may refer to physical integration of the various components of the module or to implementation as discrete components.

4.1 Spatial/Memory Switch Architecture

Figure 2:
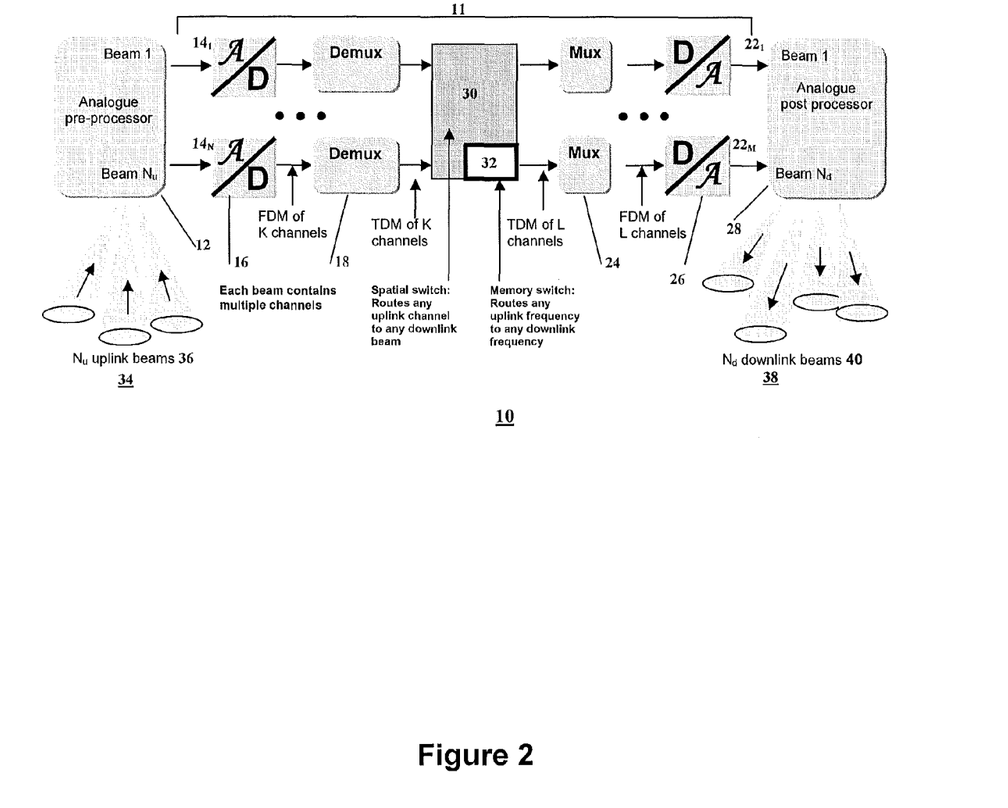
FIG. 2 is a more detailed schematic representation of the integrated processor module of FIG. 1, incorporating a central spatial/memory switch processing function applied to a mesh system architecture utilising SFPB antennas for both uplink and downlink.

FIG. 2 illustrates a mesh system architecture utilising single feed per beam (SFPB) antennas incorporating an integrated processor module 10 implementing a spatial switch architecture 30 and a memory switch architecture 32 as the central channel level processor functions 20 of the digital processor stage 11. The uplink 34 involves a plurality of spot beams $N_u$ 36, each of which contains a number of frequency division multiplexed (FDM) channels located at available frequency slots within the overall uplink band 34. There may be frequency reuse between multiple ground terminals sharing the same frequency slot provided the beams are sufficiently far apart to limit mutual interference. The downlink 38 involves $N_d$ spot beams 40, with each beam 40 containing a number of FDM channels located at available frequency slots. In an extreme instance, the capability to flexibly route any uplink channel to any frequency slot on any downlink beams may be required.

As described with reference to FIG. 2, the digital processor stage 11 of the integrated processor module 10 comprises a plurality of N input ports $14_{1-N}$, and a plurality of M output ports $22_{1-M}$, where N may be the same or different from M. Each of the uplink 36 and downlink 40 beams are typically associated with a single input port $14_{1-N}$ and output port $22_{1-M}$ respectively, of the digital processor stage 11. Each uplink beam 36 is first subjected to an analogue pre-processing function in the analogue pre-processing stage 12 where the frequency band of interest is isolated to avoid aliasing in the subsequent A/D sampling (i.e. any out-of-band signals will alias in-band as a result of the sampling process) and down-converted to an intermediate frequency (IF) suitable for subsequent sampling. The pre-processor stage 12 may be physically integrated with the digital processor stage 11 or may be a separate component, external to the digital processor stage 11.

The pre-processed uplink beam signals 36 are applied to the input ports $14_{1-N}$ and are sampled in the A/D converter 16 in order to represent the overall beam signal as a sequence of digital words. The A/D converter 16 must operate at a sufficiently fast sampling rate in order to represent the entire frequency band of interest (a maximum rate of $f_{in}$ samples per second), which in turn determines the maximum bandwidth that may be sampled (by Nyquist's theorem $f_{in}/2$, assuming real sampling) and with sufficient word length in order to limit quantisation noise associated with the conversion.

The sampled beam signals are then digitally demultiplexed in demultiplexer 18 into K individual channels by applying an appropriate digital demultiplexing architecture. This typically involves an efficient FFT based algorithm and a decimation in sample rate appropriate to the individual channels. Each channel may contain a single or multiple carriers or, in the case of a given wideband carrier, an integer number of channels may be occupied. In the latter case, it should be understood that the demultiplexer filter 18 design is such that a contiguous property allows broader band carriers to be reconstructed in a frequency multiplexing function. In practical terms, the individual channel samples are time division multiplexed (TDM) into frames where a given frame contains one sample for each channel.

A central spatial switch function 30 operates on the sampled input channels, allowing signals from any input port $14_{1-N}$ to be routed to any output port $22_{1-M}$. A given input channel may be routed to multiple output ports (multi-cast or broadcast capability) and any input channel may be routed to any frequency slot on the selected output port $22_{1-M}$. Flexibility in frequency mapping is achieved by controlling read-write functions within the memory switch architecture 32 associated with the central channel level processing function 20. As described above, the outputs from the demultiplexers (18) take the form of TDM frames where a given frame contains a single sample for each channel and the ordering of the samples within the frame is related to the channel frequency. The frequency mapping may be controlled by changing the ordering of samples within these TDM frames by writing input frames into memory and reading output frames from memory with a different ordering of samples prior to input to the multiplexers.

Each output port $22_{1-M}$ has a frequency multiplexer 24 which combines the channels routed to it, which as described above are now in the form of TDM frames with sample locations according to required frequency mapping. Each output port $22_{1-M}$ has a D/A converter 26 which operates at a rate of $f_{out}$ samples per second, which in turn determines the maximum bandwidth of the output signal (by Nyquist's theorem, $f_{out}/2$ assuming real sampling). $f_{out}$ may typically be the same as $f_{in}$, but it should be understood that this is not necessarily the case. The converted beam output port signal is up-converted to a required frequency in the post-processing stage 28 associated with the output ports $22_{1-M}$ of the digital processor stage 11 and anti-image filtering is applied so as to reject unwanted D/A converter images. The post-processor stage 28 may be physically integrated with the digital processor stage 11 or may be implemented externally.

Figure 3:
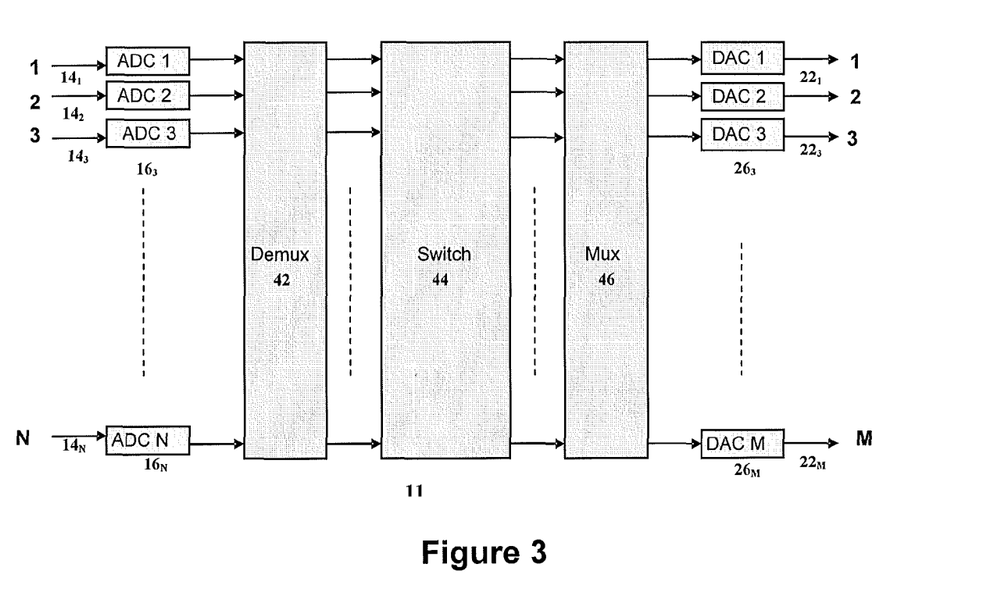
FIG. 3 shows a more detailed representation of an example of a digital processor stage that could be used as a building block of the integrated processor module of FIG. 2.

FIG. 3 shows an example of a generic digital processor stage of the integrated processor module according to one embodiment of the present invention which may be used a building block for a larger scale processor with a spatial switch architecture. The digital processor stage 11 comprises N input ports $14_{1-N}$, each with an associated A/D converter $16_{1-N}$, and M output ports $22_{1-M}$, each with an associated D/A converter $26_{1-M}$. Of the N input and M output ports, a number of these would typically be active with the others providing redundancy to the system. The digital signal processing may be regarded as broadly dividing between three ranks of functions 42, 44, 46, with a number of identical functional blocks in each rank, between which there is full connectivity. The first rank 42 provides frequency demultiplexing of the sampled inputs. The third rank 46 similarly provides frequency multiplexing to form the sampled outputs. The second central rank 44 provides the flexible routing between input $14_{1-N}$ and output $22_{1-M}$ ports; in this example (FIG. 2) a given switch function 30 receiving inputs from each demultiplexing block 18 and providing outputs to each multiplexing block 24.

4.1.1. Examples of the Application of Modular Approach to Spatial Switch Architecture In considering spatial switch architectures, the key parameters that characterise the overall processor requirements are the number of uplink and downlink beams, the occupied bandwidth on the beams and the channel bandwidth as necessary to meet flexibility requirements. Similarly the key parameters that characterise a given integrated processor module are the number of input and output ports of its digital processor stage and the digitally processed bandwidth of these ports. A number of situations characterised by different mission requirements are now discussed to illustrate the flexibility of the modular approach of the present invention.

If the number of uplink 36 and downlink 40 beams is less than the number of input $14_{1-N}$ and output $22_{1-M}$ ports respectively of the digital processor stage of the module 10, and if the bandwidth of the uplink 36 and downlink 40 beams is less than that of the respective input $14_{1-N}$ and output ports $22_{1-M}$, then a single module 10 will be sufficient with a straightforward mapping of beams to module ports. In reality, such a simplistic situation is likely to correspond to a small or piggyback mission.

If the number of uplink 36 and/or downlink 40 beams exceeds the number of input $14_{1-N}$ and/or output ports $22_{1-M}$ of the digital processor stage 11 of the module 10, but the beam bandwidths are significantly less than the respective digital processor stage port bandwidth, then a single module may again be used by associating each port of the digital processor stage 11 with multiple beams. In such a case, the pre-processor stage 12 associated with the input ports $14_{1-N}$ is structured such that a group of beam signals 34 are down-converted to different centre frequencies (selected so as to avoid overlap) and are summed prior to sampling by the input port A/D converter 16. Similarly, each output port $22_{1-M}$ of the digital processor stage 11 of the module 10 contains the signals corresponding to multiple beams 38 but again selectively offset in frequency so as to avoid overlap. Following D/A conversion at the output port, the output signals are subjected to different up-conversions in the post-processing stage 28 so as to place the beam signals at the required centre frequencies and are band filtered to reject the unwanted beam signals and D/A converter images.

For example, consider an integrated processor module 10 comprising a digital processor stage 11 with ten input ports $14_{1-10}$ and ten output ports $22_{1-10}$, each arranged to accommodate a bandwidth of 200 MHz. The satellite communications mission is characterised by twenty uplink 36 and twenty downlink 40 beams, each having a bandwidth of 100 MHz. In the pre-processor stage 12, ten pairs of uplink beam signals 36 are combined, with their centre frequencies displaced by 100 MHz so that each pair of beam signals occupy the entire 200 MHz bandwidth of a digital processor stage input port $14_{1-10}$. The inverse applies to the mapping of the output ports $22_{1-10}$ to the downlink beams 40. This concept of sub-band stacking is the subject of United Kingdom Patent Application No. GB 0708940.2 filed on 10 May 2007.

If the product of the number of uplink 36 or downlink 40 beams and the respective beam bandwidth exceeds the product of the respective numbers N of input $14_{1-N}$ and M of output ports $22_{1-M}$ and the respective port bandwidth of the digital processor stage 11 of an integrated processor module, then clearly a single module is insufficient to support the requirements of the mission. Various configurations may be implemented in this situation. In the least complex configuration, a plurality of modules is provided. The uplink 36 and downlink 40 beams are partitioned into subsets, where each subset is supported by one of the plurality of integrated processor modules 10. Again multiple uplink beam signals from within a beam subset may be multiplexed onto each input port $14_{1-N}$ of the digital processor stage 11 of the appropriate module.

For example, for a particular mission comprising twenty uplink $36_{1-20}$ and twenty downlink $40_{1-20}$ beams, each having a bandwidth of 200 MHz, two integrated processor modules $10_A$ and $10_B$ are provided. The digital processor stage 11 of each module $10_A$ and $10_B$ comprises ten input $14_{1-10}$ and output $22_{1-10}$ ports and is arranged to support a subset of ten uplink $36_{1-10}$, $36_{11-20}$ and downlink $40_{1-10}$, $40_{11-20}$ beams, with the full beam bandwidth being sampled at each input port $14_{1-10}$. However, such a configuration is not capable of providing full flexibility between all uplink and downlink beams, since channels in a given uplink subset of beams $36_{1-10}$ or $36_{11-20}$ may only be routed to beams within the corresponding downlink subset $40_{1-10}$ or $40_{11-20}$ respectively. In some instances, this may be insufficient to meet the traffic requirements within a particular mission.

In an alternative approach that is capable of providing full beam to beam routing flexibility for the situation when more than one integrated processor module is required, each module 10 is arranged to support the full number of uplink 36 and downlink 40 beams by stacking multiple segments of the overall beam bandwidth at the input ports $14_{1-N}$ of the digital processor stage 11 of the module. The number of modules 10 required is then equal to the number of bandwidth segments within the overall beam bandwidth. Consider again the previous example, comprising twenty uplink beams $36_{1-20}$ and twenty downlink beams $40_{1-20}$, each having a bandwidth of 200 MHz. Two processor modules $10_A$ and $10_B$, each supporting all twenty uplink $36_{1-20}$ and downlink $40_{1-20}$ beams may be used, with two uplink and downlink beams stacked per input and output port respectively of the digital processor stage 11 of each module, and with a bandwidth segment of 100 MHz from/to a given beam being sampled at each input and output port. A disadvantage of this approach is that the frequency mapping flexibility between uplink and downlink beams is constrained at the bandwidth segment level but in practice, this is unlikely to present a severe constraint.

In the situation where the number of input $14_{1-N}$ and output $22_{1-M}$ beam ports of the digital processor stage 11 of the integrated processor module 10 exceeds the number of beams and the beam bandwidth exceeds the digital processor stage port bandwidth, multiple modules may be used, each divided according to bandwidth segments. For example, a mission requirement involving ten beams on each of the uplink 36 and downlink 40, with a beam bandwidth of 400 MHz, two modules are required, each processing 200 MHz for the full number of beam ports.

If the product of the number of downlink beams and the downlink beam bandwidth exceeds the product of the number of output ports M and port bandwidth of the digital processor stage 11 of the integrated processor module 10, whilst the product of the number of uplink beams and the uplink beam bandwidth is less than the product of the number of input ports N and the port bandwidth, then again multiple modules are required. In this case, each of the uplink beam signals is split into multiple identical paths which are input to the respective input ports of the digital processor stage 11 for each of the modules. Each of the modules supports part of the output capacity with a subset of downlink beams being associated with a given module. Such an approach provides full flexibility with any uplink channel being routable to any frequency slot on any downlink beam. An analogous situation exists if the uplink capacity demands multiple modules whilst the downlink is compatible with the output port capacity of the digital processor stage 11 of a single module; in this case the respective port outputs of the digital processor stages of the modules are summed.

4.2. Digital Beam-Forming Architecture

Figure 4:
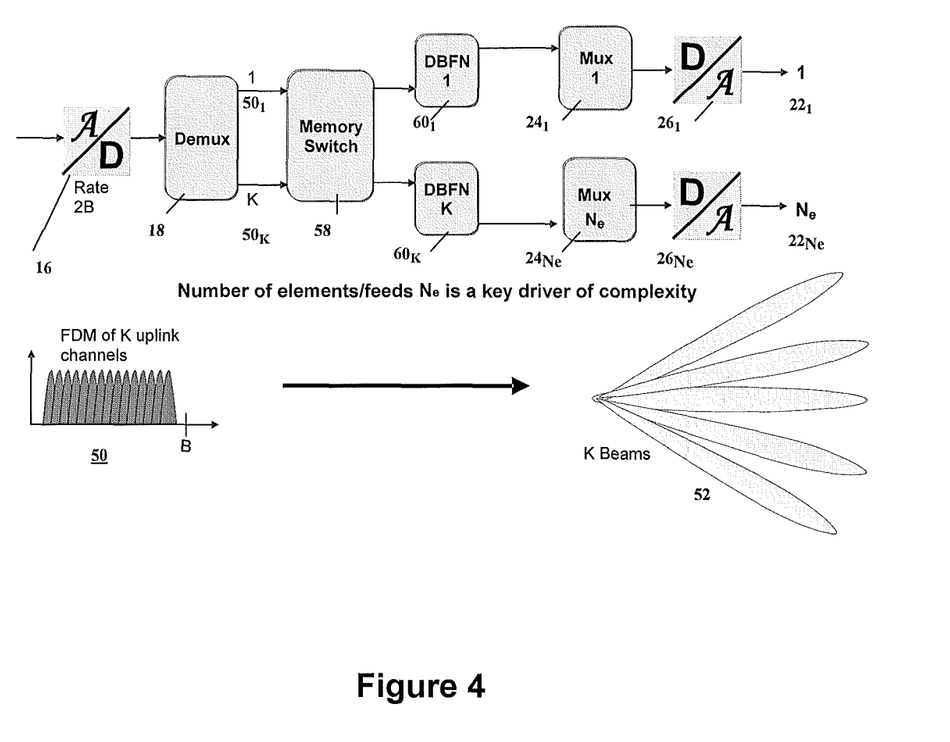
FIG. 4 is a simplified representation of the digital processor stage of the integrated processor module of FIG. 1, incorporating a digital beam-forming central processing function applied to a forward system architecture utilising a phased array antenna.

FIG. 4 illustrates a simplified digital processor stage 11 of an integrated processor module 10 according to the present invention, incorporating a digital beam-forming processing function applied to a forward link system architecture. A single gateway beam uplink 50 comprises a frequency multiplex of K narrowband channels while the downlink 52 comprises a multiple spot beam coverage provided by a phased array antenna 54 having $N_e$ antenna elements $56_{1\ldots Ne}$. According to the specific requirements of a particular mission, the flexibility to route a given uplink channel to any frequency slot within any downlink beam location is necessary.

Initially it is assumed that a single A/D converter 16 is associated with the gateway uplink 50 and a single D/A converter 26 is associated with each of the phased array elements $56_{1\ldots Ne}$ of the user downlink antenna 54.

In an analogue pre-processing stage 12, the uplink antenna signal 50, comprising K narrowband channels $50_{1\ldots K}$, is filtered to extract the band of interest and is down-converted to place the centre frequency close to zero. The uplink signal 50 is sampled in an A/D converter 16 at a rate sufficient to sample the full uplink band of interest (i.e., at least twice the bandwidth, assuming the use of real sampling). The sampled uplink signal 50 is digitally demultiplexed in the demultiplexer 18 to separate the K individual channels $50_{1\ldots K}$, with sampled channel outputs being decimated according to the channel bandwidth. The demultiplexer 18 output is typically in the form of TDM frames, each frame containing one complex sample for each of the K channels $50_{1\ldots K}$ and the ordering of the samples within the frame being related to the channel frequency. As for the spatial switch architecture embodiments described above, the demultiplexed output is fed to a memory switch 58 that is arranged to provide flexibility in frequency mapping between uplink 50 and downlink 52. The samples within each TDM frame are read into memory 58 and are then read out in a sequential order to reflect the required mapping.

Each channel $50_{1\ldots K}$ has a separate functional digital beam-forming network (DBFN) $60_{1\ldots K}$, with a sampled channel signal being split $N_e$ ways corresponding to the number of elements 56 in the phased array 54. The samples on each output path are multiplied by a predetermined complex weight which is equivalent to amplitude and phase control. The choice of complex weighting functions determines the properties of the beam associated with that channel. For example, if the set of weighting functions are selected so as to produce a uniform phase gradient across the aperture of the array, then a spot beam will be formed in the direction where the individual elements add coherently. This results in the channel being routed to a required beam location. Other sets of weighting functions may be used to control the size and shape of the beam.

A single phased array 54 forms all the downlink beams 52 and hence the channel signals must be combined for each of the array elements $56_{1\ldots Ne}$. In general, there will be spatial frequency reuse on the downlink 52 and so there are multiple digital beam-forming networks 60 corresponding to a given frequency slot and corresponding channel signals are summed for each of the array elements $56_{1\ldots Ne}$. At the output ports $22_{1\ldots Ne}$, a frequency multiplexing function 24 combines the frequency slot signals for each of the elements $56_{1\ldots Ne}$ and a D/A converter 26 converts each of the sampled element signals to analogue form. In the post-processing stage 28 associated with the output ports $22_{1\ldots Ne}$, each element signal is up-converted to the required frequency and channel filtered to reject D/A converter images. Each signal is then amplified before being applied to the appropriate antenna element $56_{1\ldots Ne}$ of the phased array 54.

It should be understood that the digital demultiplexer 18 and multiplexer 24 filter designs in the embodiments described above support the contiguous property whereby a carrier which is broader than the channel is reconstructed with the same beam-forming weighting functions being applied to the different constituent parts following the demultiplexing.

An inverse architecture may be implemented to support a return link with multiple receive digital beam-forming networks to the user uplink channels. Similarly digital beam-forming may be applied on both the uplink and downlink beams within a mesh architecture.

It should also be understood that the same basic architecture is equally applicable if the user link antenna is an Array Fed Reflector (AFR), wherein a cluster of feeds are deliberately offset from the focal plane of a reflector and a given beam is formed by the weighted addition of a subset of the feeds. In the return link case, the processor input ports $14_{1-N}$ on the user link side therefore correspond to the feeds of the AFR. In the forward link case, the AFR may be combined with a multi-port amplifier (MPA) arrangement so that amplification of a given feed signal is shared across a number of amplifiers by the use of analogue input and output networks on either side of the amplifiers. However the requirement is still that the digital processor provides the feed signals. In a further variant to the architecture, the distribution of a given feed signal to the set of amplifiers (i.e., the input network function) may be incorporated into the digital beam-forming function thus removing the need for an analogue input network.

In the case of a forward link system architecture, the input ports of the digital processor stage 11 of the integrated processor module 10 correspond to the gateway uplink and the number of available input ports $14_{1-N}$ is likely to be more than the number of gateway beams. However, if the bandwidth of the uplink exceeds the port bandwidth of the digital processor stage 11, it will be necessary to partition the overall uplink bandwidth into a number of bandwidth segments in the pre-processor stage associated with each input port. The output ports $22_{1-M}$ of the digital processor stage 11 of the integrated processor module 10 correspond to the phased array elements or the AFR feeds. Similarly, for a return link system architecture, the input ports relate to elements/feeds and the output ports relate to the gateway downlink.

4.2.1 Examples of the Application of Modular Approach to Digital Beamforming Architectures Again, the configuration in terms of module geometry will depend on the specific mission requirements. A number of different mission scenarios are now briefly described to illustrate how the modular approach can be applied in different situations. In this case, the central rank of functions comprising switches within the module architecture described with reference to FIG. 3, are replaced by digital beam-forming weighting function.

For example, if the number of phased array elements or AFR feeds is less than the number of ports of the digital processor stage 11 of the integrated processor module 10 and the bandwidth of the antenna elements or feeds is less than the port bandwidth, then a single module is sufficient. Consider a forward link system architecture, where the gateway uplink is 400 MHz and the user link phased array comprises ten antenna elements, each with a bandwidth of 200 MHz. Considering again the module example described with reference to FIG. 3 where a single module comprises a digital processor stage 11 with ten active input ports $14_{1-N}$ and ten active output ports $22_{1-M}$, each with a port bandwidth of 200 MHz. The gateway uplink 50 is partitioned into two bandwidth segments of 200 MHz at the pre-processor stage 12. Each bandwidth segment is processed by a separate input port $14_1$, and $14_2$, the remaining eight input ports $14_{3-10}$ being unused or providing redundancy. The ten output ports $22_{1-10}$ provide signals for each of the ten phased array elements. Because the bandwidth of the downlink is half of the uplink it is implicit that there is a frequency reuse factor of 2 on the downlink. Hence, it should be appreciated that the full number of input and output ports may or may not be used for all architectures.

In practice, the number of antenna elements or feeds is likely to exceed the number of output ports $22_{1-M}$ of the digital processor stage 11 of the integrated processor module 10. If the antenna element bandwidth is significantly less than that of the output port bandwidth of the digital processor stage 11 of the integrated processor module 10, then multiple element signals may be frequency stacked for a given output port $22_{1-M}$ of the digital processor stage 11. For example, consider a forward link system architecture with a phased array comprising twenty antenna elements, each with an element bandwidth of 100 MHz. A single module may be used, each output port of its digital processor stage 11 comprising a bandwidth of 200 MHz and arranged to provide two antenna element signals displaced in frequency by 100 MHz. The post-processing stage will include different up-conversions to place the element signals at the same centre frequency for the downlink 52.

In many practical cases, the product of the number of elements $N_e$ and the element bandwidth will exceed the product of the number of output ports $N_{out}$ and the port bandwidth of the digital processor stage 11 of the integrated processor module 10. Hence a single module is not sufficient to meet the system requirements. In this case, the antenna elements may be partitioned between a plurality of modules with the gateway uplink signal 50 being input to each module (forward link example). For example, consider a forward link system architecture with the phased array 54 comprising forty antenna elements $56_{1-40}$, each with an element bandwidth of 100 MHz. As in the previous example, a given output port $22_{1-10}$ can support two element signals but two processor modules $10_A$ and $10_B$ are required to support the total forty elements $56_{1-40}$. The same gateway uplink signal 50 is input to the pre-processor stage 12 of both modules $10_A$ and $10_B$, where the signal is channelised into two segments of 200 MHz. These two channel signals are applied to two of the input ports $14_1$, and $14_2$ of the digital processor stage 11 of each processor module $10_A$ and $10_B$, each module providing the channel level beam-forming weighting for twenty antenna elements with the signals for two separate antenna elements being frequency stacked at each output port $22_{1-10}$. It should be appreciated that while front end processing in terms of pre-processing 12, A/D conversion 16 and digital demultiplexing 18 is duplicated for each module 10, the overall processing is dominated by the output side, and hence such duplication represents a minimal overhead. It should also be appreciated that such architectures do not have the limitations in flexibility in terms of channel to beam routing or frequency mapping associated with the multiple module spatial switch architectures described earlier.

Similarly an inverse architecture may be applied to a return link. For a situation where multiple modules are required, an analogue summing function is necessary to combine the channel contributions from the subsets of elements associated with each of the modules. For example, consider a return link system architecture with a phased array 54 comprising forty elements $56_{1\ldots40}$, each with an element bandwidth of 100 MHz. Two modules $10_A$ and $10_B$ are required, each processing twenty of the antenna elements $56_{1\ldots20}$ and $56_{21\ldots40}$, with two antenna elements stacked in frequency at each of the ten input ports $14_{1-10}$ of the digital processor stage 11 of each module $10_A$ and $10_B$. The 400 MHz bandwidth of the gateway downlink signal 52 is divided between two output ports $22_1$ and $22_2$ of the digital processor stage 11 of each of the two modules $10_A$ and $10_B$. Each output port $22_1$ and $22_2$ of the digital processor stage 11 of each module $10_A$ and $10_B$ provides a contribution to the 200 MHz segment of gateway downlink 52 corresponding to the twenty uplink antenna elements $56_{1...20}$, $56_{21...40}$ assigned to that module $10_A$ and $10_B$. It is therefore necessary to sum the corresponding output port signals for the two modules $10_A$ and $10_B$ in order to generate the overall gateway bandwidth segments of the total forty antenna elements $56_{1...40}$ of the phased array 54. Following this summation, each respective segment is analogue frequency multiplexed to form the full 400 MHz gateway downlink 52.

Because of the non-symmetric utilisation of the input and output ports in the forward and return link architectures described above, it follows that a single processor module may support a combination of both forward and return links. The output ports $22_{1-M}$ of the digital processor stage 11 of the integrated processor module 10 are predominantly used for user element downlink signals with some ports being used for gateway downlink signals while the inverse situation is true for the input ports $14_{1-N}$. For example, consider a mission specification with both forward and return links, the gateway link utilising a single beam with 200 MHz bandwidth and the user link having a phased array with thirty six elements $56_{1...36}$, each with an element bandwidth of 50 MHz. One of the ten input ports $14_1$ of the digital processor stage 11 of a processor module 10 is used for the gateway uplink, while the other nine input ports $14_{2...10}$ are used for the element uplink signals, with four antenna element signals stacked in frequency at each of these nine input ports $14_{2...10}$. Similarly, a single output port $22_1$ is used for the gateway downlink, the nine other output ports $14_{2...10}$ being used by the element downlink signals with four antenna elements signals stacked in frequency being allocated to each of these nine ports $14_{2...10}$.

In a further variant, the integrated processor module 10 may be used to support a system architecture which uses a phased array or AFR, with digital beam-forming on both uplink and downlink.

Figure 5:
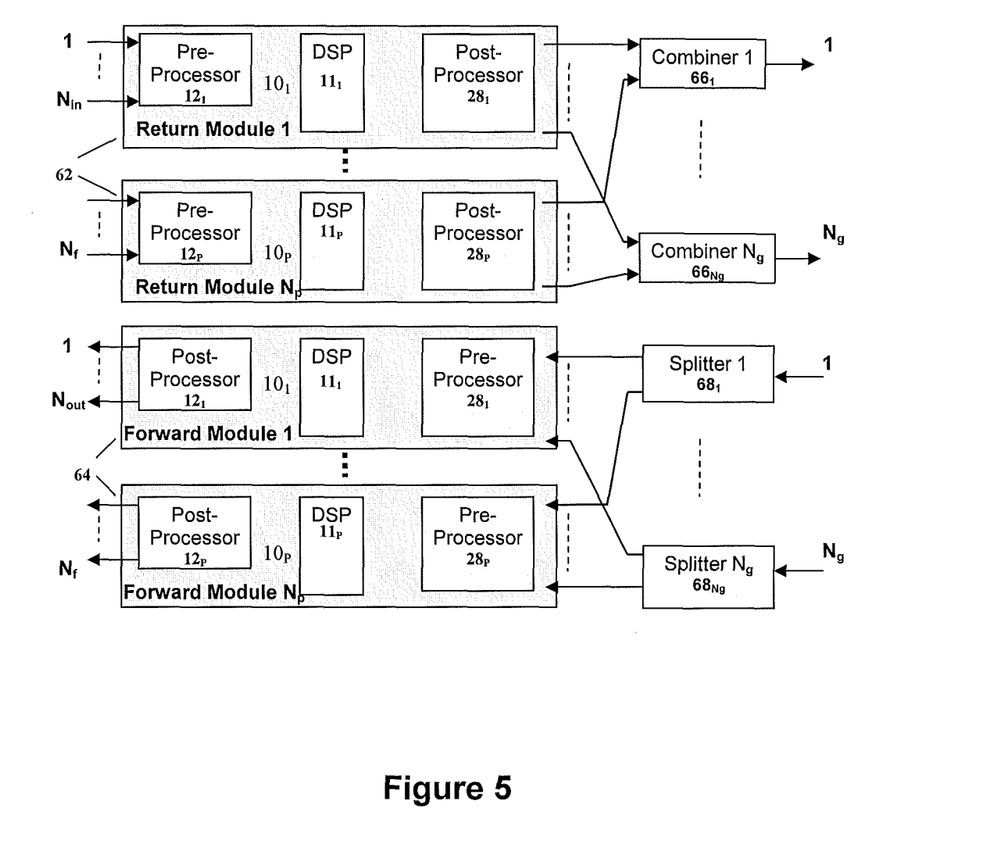
FIG. 5 is a schematic representation of a digital beam-forming multiple integrated processor module architecture, providing both forward and return link functionality, according to an embodiment of the present invention.

This modular approach to beam-forming architecture is further illustrated with reference to FIG. 5. A combined forward 64 and return link 62 system architecture is required with an AFR comprising $N_f$ individual feeds being used. Typically, twenty feeds are used to form a given spot beam. The user link feed bandwidth is such that a small number of feeds may be frequency stacked for each of the input ports $14_{1-N}$ the digital processor stage 11 of each module. There are $N_p$ integrated processor modules $10_1...10_p$ for the return link 62 and a further $N_p$ integrated processor modules $10_1...10_p$ for the forward link 64, where each integrated processor module 10 comprises a pre-processing stage 12, a central digital processor stage (DSP) 11 and a post-processing stage 28. The gateway side bandwidth requires the use of $N_g$ module ports such that, for the return link 62, $N_g$ external $N_p$-way combiners 66 are provided to combine the processed output signals, while for the forward link 64, $N_g$ $N_p$-way splitters 68 are provided to divide the processed input signals.

The invention claimed is:

1. A telecommunications satellite payload processing system comprising:
   one or more identical independent generic integrated processor modules each defining a respective independent path for a signal, wherein a number of integrated processor modules is selected in accordance with antenna and bandwidth characteristics of a specified mission uplink and downlink in relation to characteristics of a respective integrated processor module and wherein each integrated processor module comprises:
   a plurality of input ports adapted to receive signals corresponding to an uplink, each input port having a predetermined bandwidth;
   a plurality of output ports adapted to output signals corresponding to a downlink, each output port having a predetermined bandwidth;
   a digital processing stage arranged in a respective signal path between the plurality of input ports and the plurality of output ports;
   an A/D converter associated with each input port and arranged to convert an uplink signal of a predetermined bandwidth to digital sample form;
   a D/A converter associated with each of the output ports and arranged to convert a processed digital signal of a predetermined bandwidth to an analogue downlink signal;
   a plurality of frequency demultiplexers, each connected to one or more of the plurality of A/D converters and arranged to separate a sampled bandwidth of one or more of the sampled uplink signals into a plurality of channels;
   a channel level processing stage associated with each of the channels and arranged to route processed channels to any of the plurality of output ports; and
   a plurality of frequency multiplexers, each connected to the channel level processing stage and to one or more of the plurality of D/A converters and arranged to combine a plurality of routed channels.

2. A telecommunications satellite payload processing system according to claim 1 wherein the number of integrated processor modules is a function of uplink and downlink antenna ports and the respective uplink and downlink bandwidth relative to the number of input and output ports and an input and output port bandwidth of a respective digital processor stage.

3. A telecommunications satellite payload processing system according to claim 1, wherein each integrated processing module comprises:
   at least one out of a pre-processing stage and a post-processing stage.

4. A telecommunications satellite payload processing system, according to claim 1, wherein the channel level processing stage of the digital processor stage comprises:
   a spatial switch system for flexibly routing a given input channel to one or more of the frequency multiplexers associated with the output ports.

5. A telecommunications satellite payload processing system, according to claim 1, wherein the channel level processing stage of the digital processor stage comprises:
   a beam-forming network system.

6. A telecommunications satellite payload processing system according to claim 1, wherein the channel level processing stage associated with each of the channels comprises:
   a memory switch arranged to provide flexible routing between uplink and downlink frequency slots.

7. A telecommunications satellite payload processing system, according to claim 1, wherein each integrated processor module comprises:
   a pre-processing stage and the pre-processing stage is associated with the plurality of input ports of the digital processor module and is arranged to isolate a predetermined frequency band from the uplink, to down-convert the isolated band to an intermediate frequency and to apply a down-converted signal to one or more of the plurality of input ports.

8. A telecommunications satellite payload processing system, according to claim 7, wherein the pre-processing stage comprises:
a pre-processing chain associated with each of the input ports.

9. A telecommunications satellite payload processing system, according to claim 7, wherein the pre-processing stage comprises:
multiple pre-processor chains, outputs of which may be frequency multiplexed to provide predetermined input signals to one or more of the input ports.

10. A telecommunications satellite payload processing system according to claim 1, wherein each integrated processor module comprises:
a post-processing stage and the post-processing stage is associated with the plurality of outputs of the digital processor module and is arranged to filter and up-convert downlink signals to appropriate frequencies.

11. A telecommunications satellite payload processing system according to claim 10, wherein the post-processing stage of the integrated processor module comprises:
a post-processing chain associated with each of the output ports.

12. A telecommunications satellite payload processing system according to claim 10, wherein the post-processing stage of the integrated processor module comprises:
multiple post-processing chains characterised by different up-conversions and filtering.

13. A telecommunication satellite payload processing system according to claim 1, wherein each integrated processor module comprises:
both a pre-processing stage and a post-processing stage.

14. A telecommunications satellite payload processing system according to claim 1, wherein the integrated processor module is implemented in one of: a mesh link, a forward link or a return link system architecture or a combination of these architectures.

15. A telecommunications satellite payload processing system according to claim 1, wherein the integrated processor module is arranged to operate with single feed per beam (SFPB) antennas on both uplink and downlink and wherein the integrated processor module interfaces to the antennas are beam ports.

16. A telecommunications satellite payload processing system according to claim 1, wherein a user link antenna is a phased array comprising:
a plurality of antenna elements.

17. A telecommunications satellite payload processing system according to claim 1, wherein a user link antenna is an array fed reflector (AFR) comprising:
a plurality of feeds offset from the focal plane of a reflector.

18. A telecommunications satellite payload digital processing system, according to claim 1, wherein the digital processor stage is implemented in a forward link system architecture and wherein a respective input channel is split to provide signals to multiple output ports with channel samples being multiplied by complex coefficients in order to control downlink beam properties for that channel.

19. A telecommunications satellite payload digital processing system, according to claim 1, wherein the integrated processor module is implemented in a return link system architecture and wherein a respective input channel is formed by summation signals from multiple input ports with channel samples being multiplied by complex coefficients in order to control uplink beam properties for that channel.

20. A telecommunications satellite payload processing system according to claim 1, wherein the uplink or downlink relate to ground terminals supporting a frequency multiplex of a plurality of channels.

21. A telecommunications satellite payload processing system according to claim 5, wherein each uplink or downlink channel is associated with a separate digital beam-forming network, with a sampled channel being split into a number of elements/feeds on respective downlink or uplink antenna.

22. A telecommunications satellite payload processing system according to claim 20, wherein a bandwidth of the uplink or downlink is partitioned into a number of bandwidth segments, each segment being applied to or output from a single input or output port of a respective digital processor stage.

23. A telecommunications satellite payload processing system according to claim 1, wherein a signal corresponding to each uplink beam or antenna element or feed is applied to a single input port of a respective digital processor stage and/or a signal corresponding to each downlink beam or antenna element or feed is output from a single output port of the digital processor stage.

24. A telecommunications satellite payload processing system according to claim 1, wherein a signal corresponding to a plurality of uplink beams or antenna elements or feeds is applied to at least one of a single input port of the digital processor stage and a signal corresponding to a plurality of downlink beams or antenna elements or feeds is output from a single output port of a respective digital processor stage.

25. A telecommunications satellite payload processing system according to claim 24, wherein each integrated processor module comprises:
both a pre-processing stage and a post-processing stage and the pre-processing stage is arranged to selectively down-convert the signals from the plurality of uplink beams or antenna elements or feeds to different centre frequencies and to sum down-converted beams or element or feed signals prior to applying to the signal to an input port of the respective digital processor stage.

26. A telecommunications satellite payload processing system according to claim 25, wherein the post-processing stage of the integrated processor module is arranged to selectively up-convert a signal from an output port of the respective digital processor stage to a plurality of downlink beams or antenna element/feeds.

27. A telecommunications satellite payload processing system according to claim 1, comprising:
a plurality of integrated processor modules, wherein signals corresponding to a subset of a plurality of uplink beams or antenna elements or feeds are applied to at least one of the input ports of a respective digital processor stage of each module and signals corresponding to a subset of a plurality of downlink beams or antenna elements or feeds are output from the output ports of the respective digital processor stage of each module.

28. A telecommunications satellite payload processing system according to claim 1, comprising:
a plurality of integrated processor modules, wherein signals corresponding to an entire plurality of uplink beams or antenna elements or feeds are applied to at least one of the input ports of a respective digital processor stage of each module and signals corresponding to an entire plurality of downlink beams or antenna elements or feeds are output from the output ports of the respective digital processor stage of each module, and wherein each module is arranged to process a different segment of an overall beam or antenna element or feed bandwidth.

29. A telecommunications satellite payload processing system according to claim 1, comprising:
a plurality of integrated processor modules, wherein signals corresponding to predetermined frequency bandwidth segments of uplink beams or antenna elements or feeds are applied to at least one of the input ports of the digital processor stage of each module and signals corresponding to an entire plurality of downlink beams or antenna elements or feeds are output from the output ports of the digital processor stage of each module, and wherein each module is arranged to process a different segment of an overall beam or antenna element or feed bandwidth.

30. A telecommunications satellite payload processing system according to claim 1, comprising:
a plurality of processor modules, wherein each of the uplink beam signals is split into multiple identical paths which are input to the respective input ports of the digital processor stage of each module and wherein a subset of the downlink beams is associated with each module.

31. A telecommunications satellite payload processing system according to claim 1, comprising:
a plurality of processor modules, wherein a subset of the uplink beam signals are associated with each module and wherein downlink beam signals from respective output ports of the digital processor stage of each module are summed together.

32. A telecommunications satellite payload processing system according to claim 1 wherein one or more of at least one of the input ports and output ports of the digital processor stage of the integrated processor module are redundant.

* * * * *